May 2, 1961 J. P. MURTAUGH 2,982,585
CRAWLER TRACK WITH WEDGE LOCK
Filed Aug. 12, 1959 2 Sheets-Sheet 1
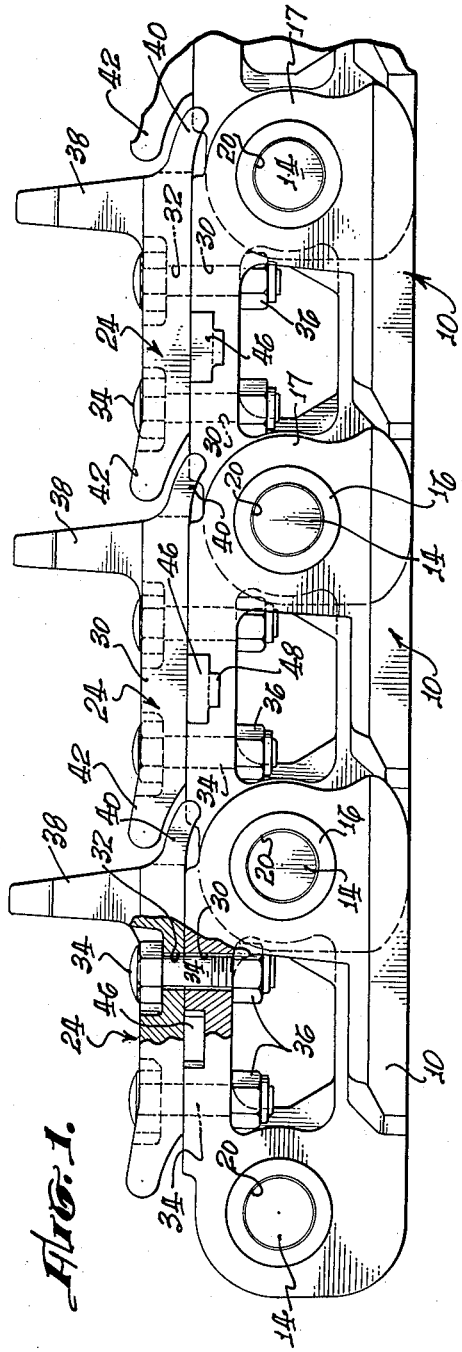
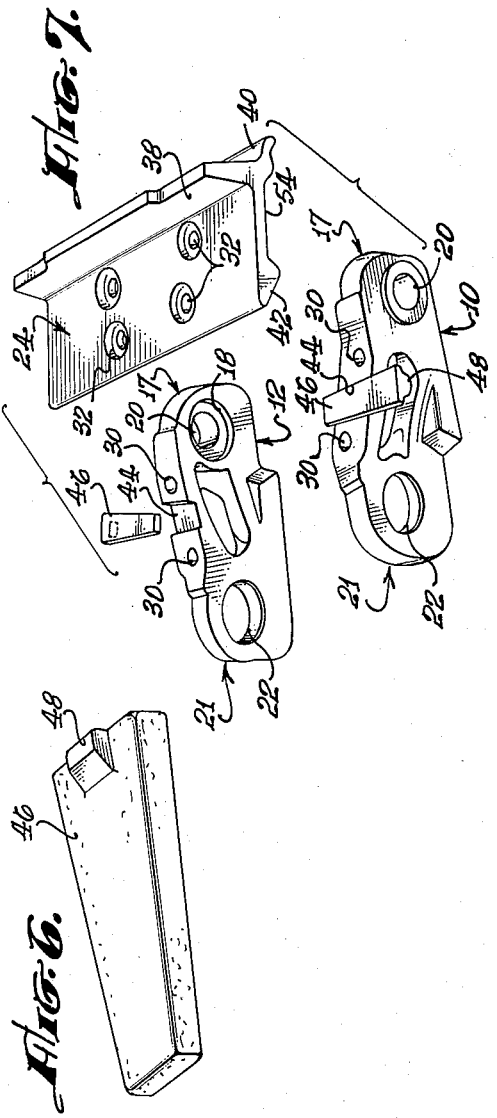
Joseph P. Murtaugh,
INVENTOR.
BY Bucklew & Lewis

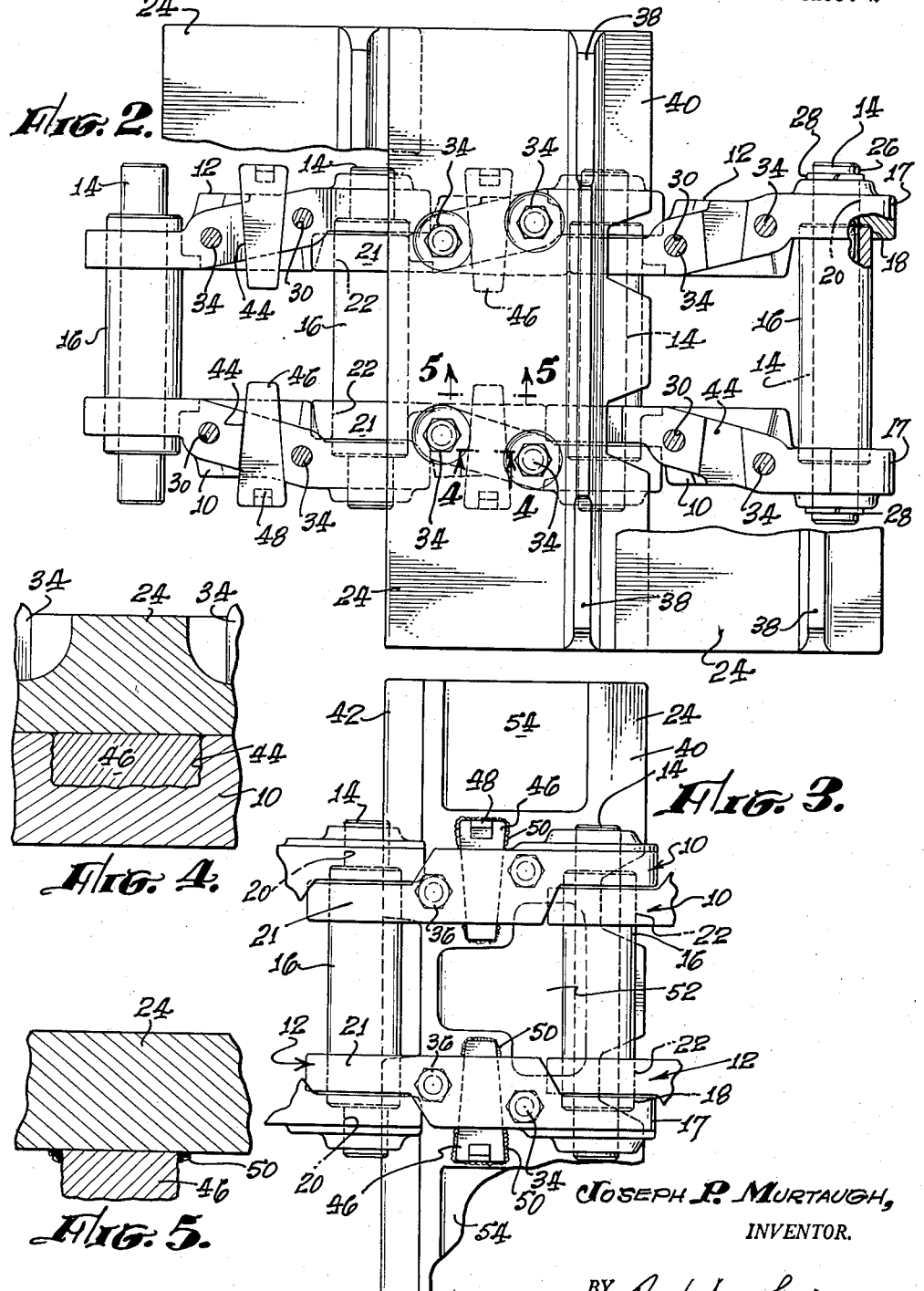

United States Patent Office 2,982,585
Patented May 2, 1961

2,982,585

CRAWLER TRACK WITH WEDGE LOCK

Joseph P. Murtaugh, Playa del Rey, Calif., assignor to Utility Trailer Manufacturing Company, Industry, Calif., a corporation of California Filed Aug. 12, 1959, Ser. No. 833,191

6 Claims. (Cl. 305—54)

The present invention relates to track assemblies used on crawler type tractors and more specifically to such assemblies as applied to heavy duty equipment.

Crawler type tractors are characterized, as is well known, by the fact that they are supported on a pair of endless articulated chains of track shoes, in parallel arrangement, on opposite sides of the vehicle. Such tractors are called "track laying" tractors and the type of track described is particularly adapted to support the tractor and its load in rough or soft terrain and to provide high traction characteristics under difficult conditions.

Crawler track assemblies of the type under discussion consists of "rails" and track shoes. The "rails" consist of a group of right hand links and an equal number of left hand links in which complementary right and left hand links are connected at their ends by bushings and pins which also serve to pivotally connect adjacent links, to provide a pair of parallel interconnected articulated endless chains. Track shoes are usually attached to the rails by means of bolts and nuts, four being used to hold each shoe to each complementary pair of links, and these track shoes provide the flotation necessary to support the weight of the machine and usually have grousers to penetrate the ground for added traction.

The above described method of connecting the track shoes to the rails is operative for the intended purpose except on the larger machines, when used to push heavy loads over rough terrain. In such heavy duty usages the inability of prior known contructions to retain a tight fit between the track shoes and the rails presents a serious problem. Unless the track shoes and rails are held in tight engagement with one another, breakage in the bolts and nuts which hold them together and also in the other component parts may occur, as a result of either excessive tension or due to shear forces. Such breakage, of course, results in loss of the productivity of the tractor and entails considerable expense in the purchase and installation of replacement parts.

The bolts in conventional track assemblies have necessarily been required to withstand tension forces as well as shear forces. Moreover, in order to minimize the shock and lateral shear forces exerted on the bolts it has been the practice to provide a minimum of clearance between the bolts and the holes in which they are retained so that binding of the bolts in the holes has occurred.

Space limitations in crawler track assemblies necessitate the use of bolts and nuts of the smallest diameter deemed practical to procure the tension required to hold the track shoes against the rails. If it were possible to secure uniform tension throughout the entire track assembly, there would be relatively little problem, provided the tension applied did not exceed the yield strength of the bolts. However, due to variations that normally exist in hardness, tensile strength and yield strength of bolts used for the purpose and also due to the variations that necessarily exist in hole sizes, bolt sizes and other factors involved, it is not possible or practical to obtain and maintain uniformity without the ever-present danger of over-stressing some of the bolts. Because of these variations, and because some of the tightening torque is developed against binding bolt hole structures rather than entirely against the track shoes and rails which are being attached to one another, there is considerable variation from the desired uniform tension after some use, and it is the advertised practice of some tractor manufacturers to instruct their users to tighten bolts after a few days operation. This means closing down the machine for a number of hours as there are several hundred bolts to tighten in the usual crawler assembly. Such tightening is usually done in the field with whatever tools are available and it is unusual to use torque meters even if they are available for this re-tightening procedure. Therefore, uneven tensions, which lead to breakage, are again created. Also, shear forces are a major problem in heavy duty equipment, since lateral movement of the shoes relative to the rails creates high recurring shear forces in the bolts and contributes greatly to their breakage in fatigue and due to over-stressing.

In view of the above, it would be desirable to have an assembly wherein the shoe securing bolts are uniformly tightened with just enough torque to assure a snug fitting nut and to employ other means to prevent lateral movement of the shoe on the rail. Prior to the present invention no such assemblies have been available which were workable and which permitted the required relatively easy removability and interchangeability of track shoes in the field.

The present invention provides simple, yet effective means for securing the track shoes securely against lateral movement relative to the rails, thus taking all of the lateral loads existing between the track shoes and the rails on which they are supported and removing all shear from the bolts so that they can be uniformly loaded on assembly and retain such loading without readjustment. Moreover, the shear members of the present invention are also effective to support the bolts in tension, hence further minimizing the dangers of over-stressing and breakage. These advantages of the present invention are all accomplished without affecting interchangeability, so that track shoes may be as readily removed as in conventional prior art assemblies despite the provision of shear absorbing lateral movement prevention means.

A further advantage of the present invention resides in the fact that the provision of means preventing lateral movement and absorbing shear, as described above, makes it possible to allow more space or clearance between the bolts and bolt-holes so that torque applied to the nuts may be more accurately measured in relation to the actual tension being placed on the bolt than in other tracks where the bolts may bind in the bolt-holes and where the bolts must necessarily act as shear members as well as tension members.

It is, therefore, an object of the present invention to provide improved track assemblies for crawler type tractors which are characterized in that breakage of the bolts holding the track shoes to the rails is minimized by the provision of means preventing shear forces from being applied to the bolts.

Still another object of the present invention is the provision of means permitting uniform bolt tensions throughout crawler track assemblies, whereby to minimize bolt breakage and "down-time."

A further object of the present invention is to provide novel means for preventing lateral movement between the track shoes and the rails, whereby tolerances between the connecting bolts and their bolt holes may be made greater so that binding does not occur and true uniform tensions may be applied to the bolts.

Another object of the present invention is the provision, in crawler track assemblies, of means for preventing relative lateral movement between the track shoes and the rails and for absorbing the shear forces therebetween, said means permitting relatively easy disassembly of the track shoes from the rails.

Yet another object of the present invention is the provision, in crawler track assemblies, of means other than the bolts and nuts which connect the track shoes to the rails for absorbing the shear forces between the track shoes and rails and for preventing lateral movement therebetween, said means serving also to support the bolts in tension.

Other objects and advantages of the invention will be readily apparent as the same becomes better understood by reference to the following detailed description of a preferred exemplary embodiment of the invention, as illustrated in the accompanying drawings, wherein like reference numerals have been appended to like parts throughout, and wherein:

Fig. 1 is a side elevation of several assembled links of crawler track construction according to the present invention, with some parts broken away for clarity of illustration, in the position assumed by the track in its upper run;

Fig. 2 is a top plan view of an assembly similar to that of Fig. 1, drawn in slightly smaller scale, with parts broken away in order that the rail construction may be better viewed;

Fig. 3 is a fragmentary bottom view of a portion of a construction similar to that shown in Figs. 1 and 2, showing the mode of connection of one track shoe to one complementary pair of rail links and the relationship of the locking wedges to the parts;

Fig. 4 is an enlarged fragmentary section taken along the line 4—4 of Fig. 2;

Fig. 5 is an enlarged fragmentary section taken along the line 5—5 of Fig. 2;

Fig. 6 is a perspective view of the wedge element which forms a part of the present invention; and Fig. 7 is an exploded view of the parts of a single track shoe and rail link assembly, with bolts and bushings not shown, the figure illustrating the position of the wedges in the assembly.

Referring now to the drawings, and particularly to Figs. 1, 2 and 3, it may be seen that the present invention is shown as applied to the usual crawler track construction, comprising rail and shoe elements. The rails, in conventional manner, comprise an articulated assembly of complementary right and left hand links 10 and 12 respectively, which are connected together in parallel relationship by pins 14 which support bushings 16 in appropriate bearings provided at the ends of the links. For this purpose, and conventionally, the bearing at one end 17 of each link is formed of stepped bores of which the larger diameter forms the bearing 18 and of which the smaller diameter is of a size to have a snug fit with the pins 14. The bearings 22 at the other end 21 of each link is a constant diameter through bore of a size to receive the bushings 16.

When the links are assembled to form the rails, the ends 21 of each complementary pair are inside the ends 17 of the next adjacent pair of links, with bearings 18 and 22 in alignment. The bushings 16 extend through bearings 18 and 22 into end contact with the step forming the smaller bore 20, which is a continuation of the laterally inwardly disposed bore which forms the bearing 18. A pin 14 extends through each bushing 16 into snug engagement with the smaller bores 20 in the link ends to complete the connection at each joint, the rail assembly thus forming a parallel pair of articulated links. It is customary, in each rail assembly, to utilize at least one so-called "master" pin as a link connector, as shown at 26, in Fig. 2. The master pin is a looser fit than the ordinary pins 14 and is held in place by split collars 28 so that an installed track may be readily removed from a vehicle by removal of a collar 14 and withdrawal of the master pin and its bushing.

When assembled in continuous unbroken form, the above described articulated chain forms the rails of a crawler track assembly, the assembly being completed by the attachment of track shoes, such shoes being generally designated by the reference numeral 24 in the drawings. This connection is effected by the provision of two bolt holes 30 in each link, and by appropriately spaced bolt holes 32 in each track shoe, the last named bolt holes being preferably countersunk, as shown.

Each track shoe is attached to a complementary pair of right and left hand links by inserting high strength bolts 34 through the matching bolt holes of the track shoes and the links. The bolts are then fitted with high strength lock nuts 36 and are tightened down to a prescribed torque and tension, this completed assembly being best shown in Fig. 1. The track shoes generally have grouser means 38 for traction purposes and are each generally provided with a rounded downwardly angled portion 40 at one longitudinal edge and with a loosely matching upwardly angled portion 42 at the opposite edge, whereby adjacent shoes may have an interengagement to provide a relatively closed surface in the flat run of the track.

The construction described thus far is that of conventional crawler track assembly. The present invention relates to certain novel additions and variations in such conventional constructions as to provide greatly improved performance characteristics and such additions and variations will now be described. In the practice of the present invention, the rail links 10 and 12 of each complementary pair are provided with laterally extending tapered slots 44 opening into the surfaces that in Fig. 1 are shown as upper surfaces, which slots are engaged by the track shoe in the final assembly, the slots being narrowest internally of the assembled rails. Each link may be provided with a wedge 46 tapered similarly to the taper of the slot 44, the said wedges being flat on one face, and having a stop or grip element 48 on the other face.

As previously mentioned, the wedge and taper construction is effective, in a manner to be explained hereinafter, to remove shear from the bolts. Accordingly, it is possible and entirely practical to allow more space, or clearance, between the holes and the bolts, thus insuring free-running bolts, without danger of binding in the holes. The links and track shoes utilized in the present invention may therefore be provided with bolt holes which provide adequate clearances so that the bolts are free running, without danger of binding in the holes.

In the assembly of a crawler track according to the present invention the track and shoe assembly is completed and the bolts set in the conventional manner, it being noteworthy that the torque applied to the bolts may be more accurately measured in relation to the actual tension being placed on the bolts than in prior art tracks wherein bolt hole binding occurred and wherein the bolts necessarily functioned as shear members as well as tension members. As a result, therefore, the shoe and track assemblies of the present invention may be said to be characterized by uniformly tight nuts and a high degree of uniformity in the tension of all of the bolts throughout the complete assembly, thus providing a greater margin of safety against either over-stressing or under torquing these important holding members.

After the track shoes and rails have been assembled, and the bolts set, the tapered wedges 46 are driven in place in the slots either with a heavy hammer or an air powered tool, the flat sides of the wedges being placed, of course, adjacent the under sides of the track shoes. Sufficient force is exerted in driving the wedges to assure a tight fit of the tapered surfaces on the wedges against the correspondingly tapered surfaces of the slots 44 in the rail links. For utmost cooperation of the track shoes with the wedges it is preferable that the under sides of the track shoes have an appropriately positioned cooperating flat bearing surface. Accordingly, it is necessary that the configuration of the depressed lightening area 52 and of the end lightening areas 54, be such as to provide flat bearing surfaces for the wedges, as best shown in Fig. 3.

It will be noted that the wedges are somewhat longer than the width of the links, leaving exposed portions at either end of the wedges, on opposite sides of the links, these exposed edges resting against the adjacent under-sides of the track shoes. The exposed portions of each of the driven wedges are welded securely to the under side of the related track shoe, as shown at 50, but not to any portion of the rail section, it being noteworthy at this juncture, that removal of a track shoe is not hindered by the wedge and that the track shoes may be removed in the field, by removing the bolts and driving the shoe, with wedge attached, in an upward direction (upward in Fig. 1).

The novel wedge construction described in the preceding paragraph is effective to withstand the shear forces between the track shoes and the rails, since each wedge is tightly driven into a slot 44 in a rail link and welded to a rail shoe so that lateral movements of the parts relative to one another are effectively inhibited. Accordingly, the track shoe-rail bolt and nut systems may readily be uniformly tensioned with the advantageous results previously discussed.

It is an important ancillary feature of the present invention that the tapered wedge may be made to support the bolts in tension to further assist in preventing overstressing of the bolts. This effect may be accomplished by making the wedge of material which is softer than that of the links 10, 12 and by providing relatively rough surfaces in the tapered grooves 44 of the said links and on the walls of the wedges 46.

As an example, if the rail links are made of alloy steel, of a hardness of about 30 Rockwell, on the "C" scale (which is in a conventional range), the wedges may be made of low carbon steel, with a hardness of less than 20 Rockwell "C." The links are castings, the tapered slots being cast therein, and the wedges are either castings or forgings. The contacting wedge and slot surfaces are not machine finished so that they are relatively rough, as best seen in Fig. 4.

The above combination of different hardness of parts and of rough finish gives the wedge and tapered slot arrangement the ability to resist relative movement in any direction, either laterally (shear) or vertically (tension) in normal tractor operation. Since the wedges are softer than the walls of the tapered slot in the links, deformation of the wedges takes place within the confines of the tapered slot, so that the serration-like roughened walls of the tapered slot and the wedge are elastically interengaged with one another. Since these irregularities occur in every direction, it will be apparent that the wedge 46 (Fig. 4) will resist relative movement of itself (and track shoe 24 to which it is welded) in either an upward or lateral direction relative to the slot 44 in the link. The resistance to vertical movement is of direct support and assistance to the bolts in tension.

From the above it may be seen that the present invention provides novel improvements in crawler track assemblies which are effective to greatly improve the performance thereof under heavy duty conditions by making it possible to uniformly tension the bolts which hold the track shoes to the rails, within the strength limits of the bolts since the novel tapered wedge locking device described hereinabove is effective to take all of the shear stresses off the bolts. It may also be seen that other advantages are inherent in the novel construction. For example, by virtue of the shear absorption function of the wedges, the bolt holes may be made larger for easier fit and for avoidance of binding, so that uniform tensioning, longer bolt life and longer and more reliable performance are achieved. Moreover, it may be seen that the novel wedge arrangement is effective to support the bolts in tension, this effect assisting in achieving uniform bolt tensions under the strength limitation of the bolts.

Obviously, many variations and modifications of the invention are possible within the scope of the teachings of the present invention. It is therefore to be understood that it is not intended that the invention be limited by the illustrative modification specifically described herein, but rather by the scope of the appended claims.

I claim:

1. A crawler track assembly comprising rails formed of complementary pairs of links attached to one another in parallel relationship, each such pair being pivotally attached at each end to another similar pair to form parallel articulated chains, tracks shoes adapted to be attached, one each to one of said complementary pairs of links, matching bolt holes in said track shoes and in said links, bolts passing through said matching bolt holes, and nuts tightened on said bolts to securely attach said track shoes to said links, a transverse groove in each link of at least one complementary pair of said links, said grooves opening into the surfaces thereof against which the under surface of the attached track shoe abuts, separate wedge means tightly engaged in each of said transverse grooves, said wedge means having a length such that portions thereof extend laterally beyond said grooves on both sides thereof, said laterally extending portions being welded to the said under surface of the attached track shoe, whereby the wedge means are effective to absorb shear forces between the links and the track shoe, and whereby the bolts securing the track shoe to the links are stressed only in tension, said grooves being tapered in the transverse dimension of the links and the wedge means being correspondingly tapered, whereby driving of said wedge means into said grooves causes gradual tightening of the parts.

2. A crawler track assembly according to claim 1, further characterized in that the inner surfaces of said grooves and the matching walls of said wedge means are of rough finish to provide maximum frictional gripping in all directions, so that the wedge means are effective not only to absorb shear forces, but also to support the bolts in tension.

3. A crawler track assembly according to claim 2, further characterized in that the said wedge means are of softer material than the material of said links, whereby protuberances in the roughened walls of the wedge means are resiliently expanded into protuberances in the roughened walls of the grooves in the links.

4. In crawler track assemblies of the type wherein track shoes are bolted to rail links by bolts pasing through matching bolt holes therein, said bolts having nuts thereon tightened to hold said track shoes and rail links securely together; the improvement comprising transverse tapered groove means in the links opening into the surfaces of said links which abut the track shoes connected thereto, correspondingly tapered separate wedge means driven into said grooves and contacting the link abutting surfaces of the track shoes and welded to the shoes, whereby to absorb shear forces between the track shoes and the rail links so that said bolts are stressed only in tension.

5. A crawler track assembly comprising rails formed of complementary pairs of links attached to one another in parallel relationship, each such pair being pivotally attached at each end to another similar pair to form parallel articulated chains, track shoes adapted to be attached, one to each one of said complementary pairs of links, matching bolt holes in said track shoes and in said links, bolts passing through said matching bolt holes, and nuts tightened on said bolts to securely attach said track shoes to said links, a transverse groove in each link of at least one complementary pair of said links, said grooves opening into the surfaces thereof against which the under surface of the attached track shoe abuts, separate wedge means tightly engaged in each of said transverse grooves, said wedge means having a length such that portions thereof extend laterally beyond said grooves on both sides thereof, and means on said track shoes engaging the laterally extending portions to prevent relative sliding motion of the track shoe and the links, whereby the wedge means are effective to absorb shear forces between the links and the track shoe, and whereby the bolts securing the track shoe to the links are stressed only in tension.

6. As an article of manufacture, a link adapted for use in forming the parallel articulated chains which comprise the rails of crawler track assemblies, said link having bearing means in each end thereof adapted to receive pins and bushings for effecting attachment with a parallel complementary link and with end attached similar links for forming said rails; each link having a flat longitudinal surface, adapted to abut the under face of a track shoe attached thereto, bolt holes extending through said surface, and a groove openng into said link surface, extending transversely through the link from side to side and tapered in its transverse extent, and being adapted to take a correspondingly tapered and transversely driven wedge.

References Cited in the file of this patent

UNITED STATES PATENTS

| | | |
|---|---|---|
| 1,327,556 | Holt | Jan. 6, 1920 |
| 1,456,348 | White | May 22, 1923 |
| 1,587,097 | White | June 1, 1926 |
| 1,588,549 | Harkness | June 15, 1926 |
| 2,393,336 | Myers | Jan. 22, 1946 |

FOREIGN PATENTS

| | | |
|---|---|---|
| 1,067,020 | France | Jan. 27, 1954 |